(12) United States Patent
DeKeyser et al.

(10) Patent No.: US 7,747,143 B2
(45) Date of Patent: Jun. 29, 2010

(54) DIGITAL VIDEO RECORDER

(75) Inventors: Paul H. DeKeyser, Irvine, CA (US);
Michael H. Collender, Laguna Hills, CA (US); Charles F. DeKeyser, Colorado Springs, CO (US)

(73) Assignee: Fast Forward Video, Inc., Irvine, CA (US)

( * ) Notice: Subject to any disclaimer, the term of this patent is extended or adjusted under 35 U.S.C. 154(b) by 1395 days.

(21) Appl. No.: 10/043,804

(22) Filed: Jan. 11, 2002

(65) Prior Publication Data

US 2002/0131765 A1 Sep. 19, 2002

Related U.S. Application Data

(60) Provisional application No. 60/261,932, filed on Jan. 15, 2001.

(51) Int. Cl.
*H04N 9/77* (2006.01)
(52) U.S. Cl. .......................... 386/125; 386/49; 386/95; 386/68; 386/69; 386/70
(58) Field of Classification Search .................. 386/86, 386/95, 46, 68–70, 125
See application file for complete search history.

(56) References Cited

U.S. PATENT DOCUMENTS

| 5,488,409 | A | * | 1/1996 | Yuen et al. ..................... 725/41 |
| 5,974,218 | A | * | 10/1999 | Nagasaka et al. ............. 386/46 |
| 6,377,745 | B2 | * | 4/2002 | Akiba et al. .................. 386/68 |
| 6,934,464 | B1 | * | 8/2005 | Ayaki et al. .................... 386/95 |
| 2002/0163963 | A1 | | 11/2002 | Moote et al. |
| 2004/0039867 | A1 | | 2/2004 | Apfeldorfer et al. |
| 2005/0031319 | A1 | | 2/2005 | Fujita et al. |

OTHER PUBLICATIONS http://www.spyville.com/color-video-glasses-camera.html/ Color Video Glasses Camera with Clear Lens.

* cited by examiner

*Primary Examiner*—Marsha D Banks Harold
*Assistant Examiner*—Daniel Tekle
(74) *Attorney, Agent, or Firm*—Fish & Associates, PC

(57) ABSTRACT

A unique high performance digital video recorder having a number of novel features. The recorder's electronics are all on a unitary printed circuit board. The recorder also requires at least one hard disk drive and audio and video input analog signals (from a source such as video camera or broadcast media) as well as a suitable monitor for receiving output audio and video analog signals. A external time code generator (i.e., VITC digital clock) is also required for synchronization. Also required are various manual control devices (i.e., panel controls) for mode selection. The electronics of the preferred embodiment comprise A-to-D and D-to-A converters, a hard disk interface, a JPEG compression encoder/decoder, a multi-port DRAM and DMA subsystem, a microprocessor with RS-232 and RS-422 access ports, various working memory devices and bus interfaces and a 16-bit stereo digital audio subsystem. Novel features of the preferred embodiment include use of an index table for disk addresses of recorded frames, a multi-port memory controller in the form of a field programmable gate array (FPGA), loop recording using dual channels, and dynamic JPEG compression compensation.

8 Claims, 10 Drawing Sheets

DIGITAL VIDEO RECORDER

CROSS-RELATED APPLICATION

This application takes priority from Provisional Patent Application Ser. No. 60/261,932 filed Jan. 15, 2001.

BACKGROUND OF THE INVENTION

1. Field of the Invention

The present invention relates to certain improvements in digital video recording.

2. Background Art

Compressed video frames are variable in size depending on the complexity of the picture. Therefore, the recorder must maintain a directory of video frame disk addresses to support cueing (jumping to an arbitrary frame), random access playback (switching seamlessly without hesitation or interruption among material recorded at different physical locations on disk), and "feature" playback (fast forward and reverse scan).

Typically, this frame directory is kept on disk. With this approach, when a user submits a cue command, the recorder must read the directory first to determine the disk address, then read the frame from disk. This latency results in a visible hesitation or requires that the cue command be received some period in advance of the required cue. There is a need to overcome such latency.

Conceptually, recording and playing motion video to and from hard disk is simply performing the conversion from its analog (or uncompressed digital) format to a continuous compressed data stream and managing this continuous stream of data as a series of "writes" or "reads to" or "reads from" hard disk.

The hard disk is the slowest component in the system. To achieve the performance threshold that broadcast quality playback requires, it is necessary to interface to the hard disk at maximum efficiency. The data transfer method must be tailored to the hard disk's characteristics. With modern hard disks, the highest performance interface is achieved with burst data transfers of a size that matches the disk's cache memory. There is a need to implement burst data transfers appropriate for video data at maximum efficiency.

The user configures a recorder to record video at a specified compression ratio, for example, 4:1. The disk may not be able to sustain this specified data rate when the user has installed a low performance disk or if the image data frequency changes from simple pictures (black frames, for example) to complex ones. For example, one may watch MTV for a few minutes for excellent examples of video that stress JPEG compression rate-averaging algorithms. If the disk falls far enough behind, the result is catastrophic: The record stream skips frames, losing them irretrievably. There is a need to control compression so that such catastrophic results are averted.

Certain applications benefit from the ability to record continuously. In surveillance, for example, it is useful to record until an alarm occurs, then to stop some time after the alarm. The recorder has captured time before, during, and after the alarm, which can be useful in determining the cause of the alarm. There is a need to provide support for such a loop recording mode.

SUMMARY OF THE INVENTION

To overcome directory-based latency, the recorder of the present invention reads the disk addresses of all recorded frames into memory on startup and maintains this index table as material is recorded and deleted. The in-memory index table eliminates a disk access before loading the required frame. The benefit is instantaneous cueing (latency of only one frame time), on-the-fly changes to the playback sequence, and generally quick response to user motion control. The cost is providing adequate memory to contain the address of every frame (at 108,000 frames per hour). The invention provides adequate index table space to support random access within eight hours of recorded video, expandable to more than forty hours with an "extended time module" daughter card.

The invention's memory controller, implemented in the preferred embodiment in a Xilinx FPGA, accommodates the disk's data transfer requirements by performing this burst DMA transfer in programmable size data blocks. A memory controller makes extensive use of the "extended data out" (EDO) feature of dynamic random-access-memory to enhance data transfer speeds.

Further, the memory controller must arbitrate access among several additional diverse devices which share the same memory. The controller must also support the unique data transfer characteristics of these other devices without compromising the burst DMA timing required by the hard disk interface.

1) Compressed video DMA must move continuously, with possible extreme peaks in the data rate. Average data rate is at least 5 megabytes per second for broadcast quality;
2) The graphics overlay requires memory accesses at fixed intervals in sync with the video raster, fixed data rate of about 5 megabytes per second;
3) The uncompressed video channel, when used, requires fixed timing at 27 megabytes per second;
4) The CPU has latency restrictions and must complete memory access within stringent limits. The amount of data transferred by the CPU includes digital audio, running at 192 kilobytes per second;
5) The memory requires refresh cycles with a maximum latency restriction.

The invention's firmware supports a "loop record" mode where the recorder first fills available space, then continues recording by overwriting the oldest video. To continue this process indefinitely is difficult because the video frames vary in size and the index table, like the video frames themselves, must be maintained in a circular manner. Further, the recorder must be able to stop at any moment and be able to play back the video as expected (oldest to newest) regardless of how it is actually stored on disk.

Another application that takes advantage of loop recording and adds another level of complexity is "time delay", where the device continuously records a stream of video and plays the same stream back some fixed interval of time later. The invention's firmware supports this application where two circuit boards share a common disk array. One board is dedicated to recording, the other board to playback. The two circuit boards communicate over a serial link. The recording board passes the information required for playback to the playback board. This configuration can also be used for "instant replay" type applications because the playback board can randomly access and play back the majority of the video frames stored on disk by the recording board.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
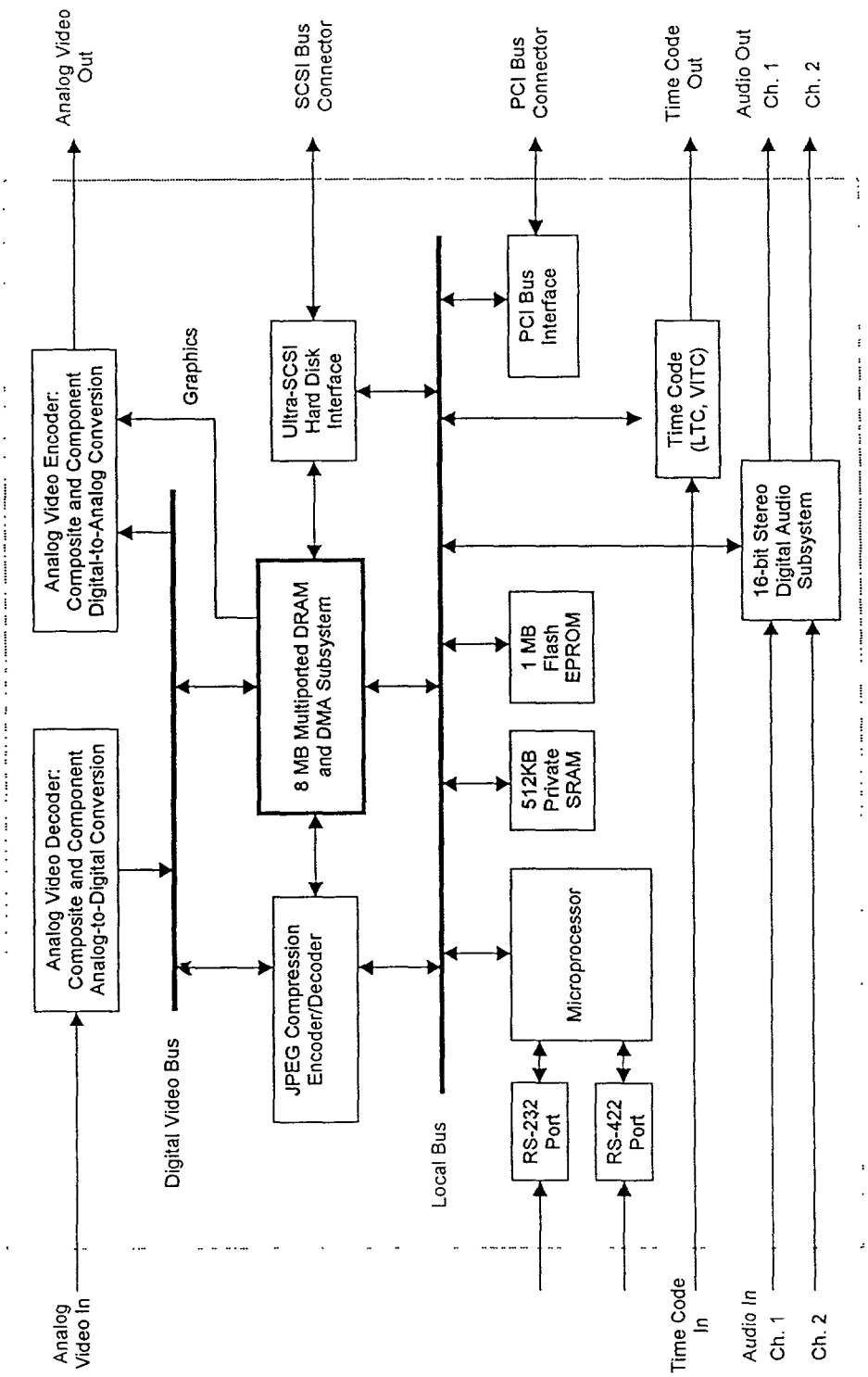
FIG. 1 is a block diagram of the architecture of the video recorder of a preferred embodiment of the invention.

The present invention comprises a unique high performance digital video recorder having a number of novel features. The recorder's electronics are all on a unitary printed circuit board, a block diagram of which is provided in FIG. 1. The recorder also requires at least one hard disk drive and audio and video input analog signals (from a source such as video camera or broadcast media) as well as a suitable monitor for receiving output audio and video analog signals. A external time code generator (i.e., VITC digital clock) is also requires for synchronization. Also required are various manual control devices (i.e., panel controls) for mode selection as will be discussed hereinafter. The electronics of the preferred embodiment comprise A-to-D and D-to-A converters, a hard disk interface, a JPEG compression encoder/decoder, a multi-port DRAM and DMA subsystem, a microprocessor with RS-232 and RS-422 access ports, various working memory devices and bus interfaces and a 16-bit stereo digital audio subsystem. The novel features of the preferred embodiment comprise use of an index table for disk addresses of recorded frames, a multi-port memory controller in the form of a field programmable gate array (FPGA), loop recording using dual channels, and dynamic JPEG compression compensation. Each of these features will now be described in sufficient detail to enable those having ordinary skill in the relevant art to make and use the invention without undue experimentation.

Index Table

During recording, individual frames of video are compressed and stored sequentially into contiguous regions of unused disk space, called "Available Records". A particular recording of a continuous sequence of video frames, called a "clip", may span many Available Records across many individual disk drives, up to the total amount of disk space available (see FIG. 2). The recording process uses all Available Records on one particular disk drive before continuing onto another disk drive. For each Available Record, the recording process is provided with the disk drive unit number, the size of each addressable block on that disk drive (or "block size"), and the starting and ending disk addresses of the recordable area of the Available Record.

Figure 2:
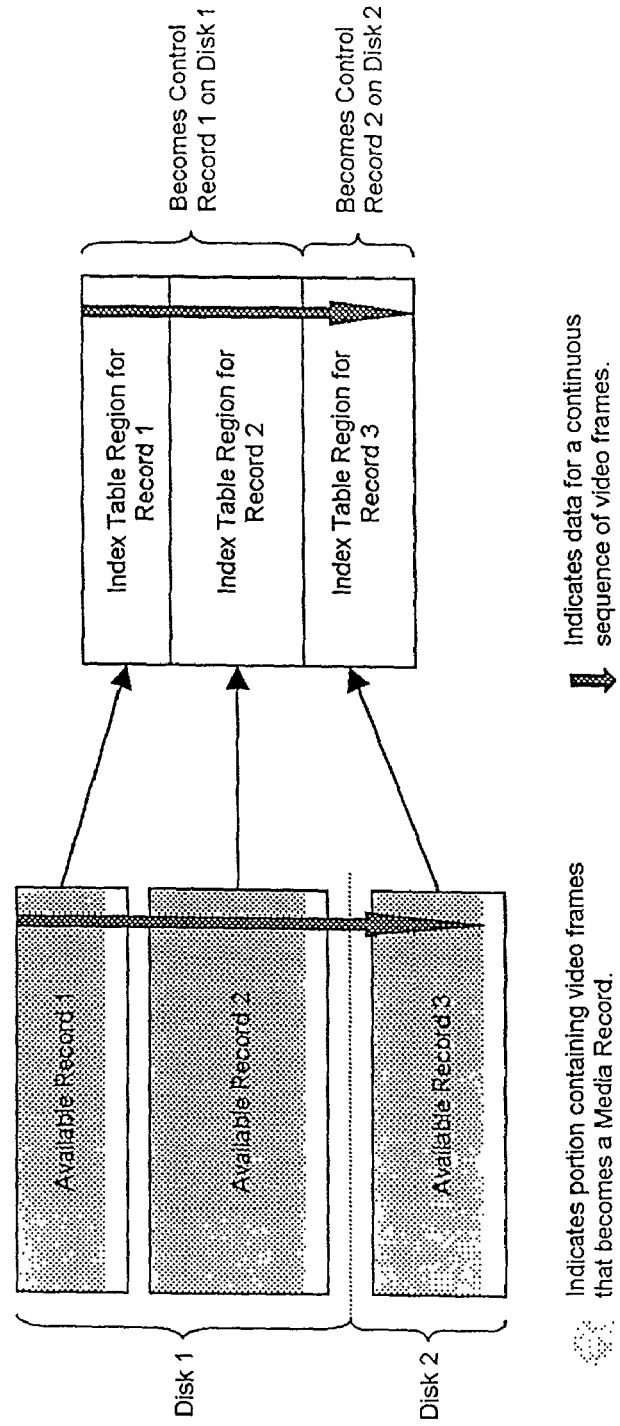
FIG. 2 is a block diagram representation of the relation between hard disks and index tables used in the preferred embodiment.
Figure 3:
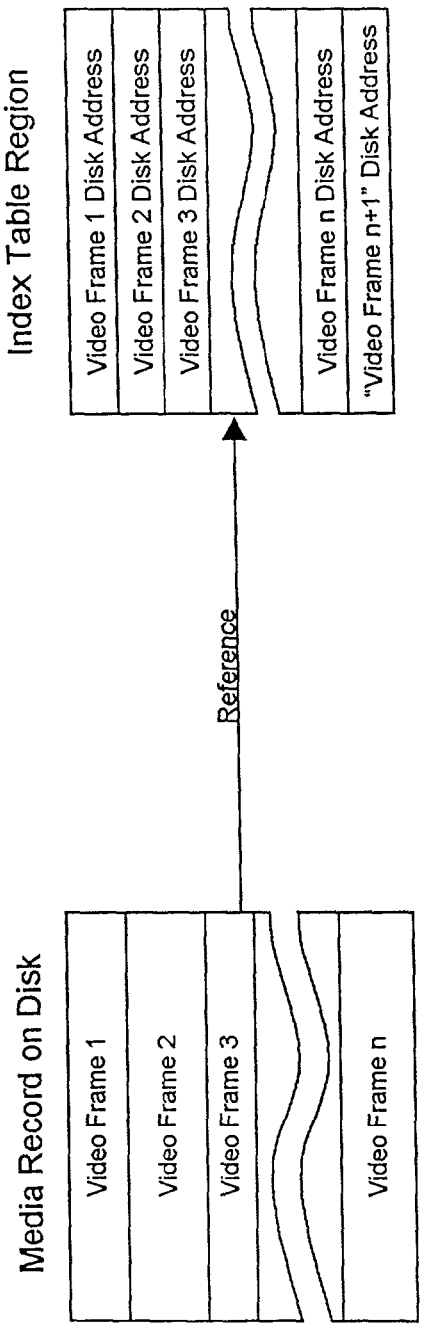
FIG. 3 is a block diagram representation of the relation between individual video frames and index table regions.

Given the starting disk address and block size, along with the size of each video frame derived from the video compression process as frames are stored into memory, the recording process is able to calculate the starting disk address for each video frame, as well as the starting disk address for the next video frame to be stored (see FIG. 2). It is these starting disk addresses that are placed into the index table. For the last video frame in each Available Record, the "starting address" for the "next" video frame is also placed into the index table, although video is not actually stored at this disk location. (if the recording process continues, this video frame would be stored at the starting address of a new Available Record since the recording process is able to calculate that the video frame is too large for the space left in the current Available Record.) The region used to store video frames within an Available Record becomes a "Media Record" (see FIG. 2). Thus for each Media Record, the corresponding region of the index table consists of a sequential set of disk addresses, the number of which is one more than the number of video frames in the Media Record (see FIG. 3). This allows the starting disk address and number of disk blocks for each frame of video on disk to be known during the playback process prior to the frame being retrieved from disk.

The associated index table region for each Media Record is also stored on the same disk as the Media Record as a "Control Record". (The recording process insures there will be space for the Control Records left on the disk drive.) While conceptually there could be a Control Record for each Media Record, in the preferred embodiment the index table and the derived Control Record are both continuous and contiguous for all Media Records of a single clip on a single disk drive (see FIG. 2). This maintains the proper sequence for the subset of the clip's video frames stored on that disk drive. (The various Control Records and Media Records of a clip are associated by using a unique clip identification number, or "Clip ID". The proper sequence of Control Records and Media Records is maintained using a sequential "Sequence Number". These numbers are also stored with each Control Record and Media Record, along with the number of video frames represented or contained within the Record. It is important to note that each video frame consists of two video fields, and that the audio associated with a video frame may be stored with the video frame or separately in "Audio Records". Since frames of audio are of a fixed size, there is no need for a separate index table for audio data.)

Prior to initiating playback of any particular clip, all Control Records for that clip are loaded into the index table to allow for random frame access. While this must happen at least just prior to initiating playback, for increased performance, the circuit card software loads all Control Records into the index table upon startup, and maintains the index table as video frames are recorded and deleted, and as disk drives are added and removed. When a Control Record is loaded into the index table or stored after recording, the Media Records and related index table regions are associated using an implementation specific identifier called an index table "reference".

In the invention, the index table is implemented within a reserved area of memory and managed by an implementation specific set of software routines, which include index table memory management. The software interface to the index table includes:

1. Initializing the index table for use upon startup.

2. Loading a Control Record into the index table and obtaining the associating index table references.
3. Obtaining the disk address of any video frame given the reference and frame number within the frame range (including the ending "next" frame address).
4. Deleting video frames from a referenced index table region.
5. Deleting a referenced index table region.

The software interface to the index table used during recording is more complex. Since the index table memory region is managed internally, the interface provides mechanisms to let the recording process know if the index table is out of free space, or if an index table region boundary will require an Available Record to be fragmented into two or more Media Records. The interface for recording includes:
1. "Opening" free index table space for use during the recording process.
2. Appending frame addresses to the index table sequentially during recording.
3. Overwriting previously stored frame addresses (used during loop recording).
4. Removing previously stored frame addresses (used for video tape emulation and frame buffer transfer features).
5. Indicating the free space available in the index table region for recorded video frame addresses.
6. Freeing used index table space when aborting a recording in progress.
7. "Closing" index table space at the end of the recording process.
8. Obtaining references for associating index table regions to Records.
9. Writing a Control Record to a disk drive from the index table.

Loop Recording

In order to record video frames to disk, the recording process of the inventive circuit card needs to have both unused space on disk (i.e., one or more Available Records) and unused (free) space in the index table uniquely allocated for its use. This space must be uniquely allocated to the recording process to prevent other processes from concurrently writing to these spaces, creating a memory conflict and corrupting the recorded data. While, conceptually, all the free space needed or available could be allocated just prior to recording, the inventive firmware allows unused space to be allocated both prior to initiating recording (Available Records are pre-allocated and become "Reserved Records") or just prior to being needed during the recording process. This latter case allows other processes to obtain disk space for use while recording is in progress.

The invention manages and allocates disk space by maintaining in memory a directory of records on disk. The disk record directory contains the following for each record on disk:
1. The disk drive unit number containing the disk record.
2. The disk block address of the start of the disk record.
3. The disk block size of the disk record.
4. The type of the disk record (e.g., Available Record, Media Record, Control Record).

During recording, the disk record directory also contains the following for each allocated Available Record being recorded to:
1. The allocation flag.
2. The reference to the next Available Record in the recording allocation sequence.
3. The reference to the index table region associated with the video frames recorded into the Available Record.
4. The number of video frames recorded into the Available Record and represented in the associated index table region.

The recording process allocation firmware allocates and links in additional Available Records prior to their use by filling in the reference to the Available Record just allocated into the directory entry of the Available Record into which video data is currently being recorded. This continues until there are no more Available Records left, at which time the linkage is either terminated (loop record disabled) or referenced back to the first Available Record directory entry (loop record enabled). As recording into an Available Record is initiated, the reference for the start of the index table region to be used is placed into the Available Record's directory entry. The recording process then updates the number of frames in the Available Record's directory entry, as video frames are stored on disk. Note that if a recording does not use an allocated Available Record, it is deallocated when recording is terminated.

As mentioned previously, after a recording is completed, the disk record directory also contains the following for each resulting Control Record and Media Record in the clip:

The unique clip identification number (Clip ID) for the clip.

The Sequence Number of the disk record within the clip.

Figure 4:
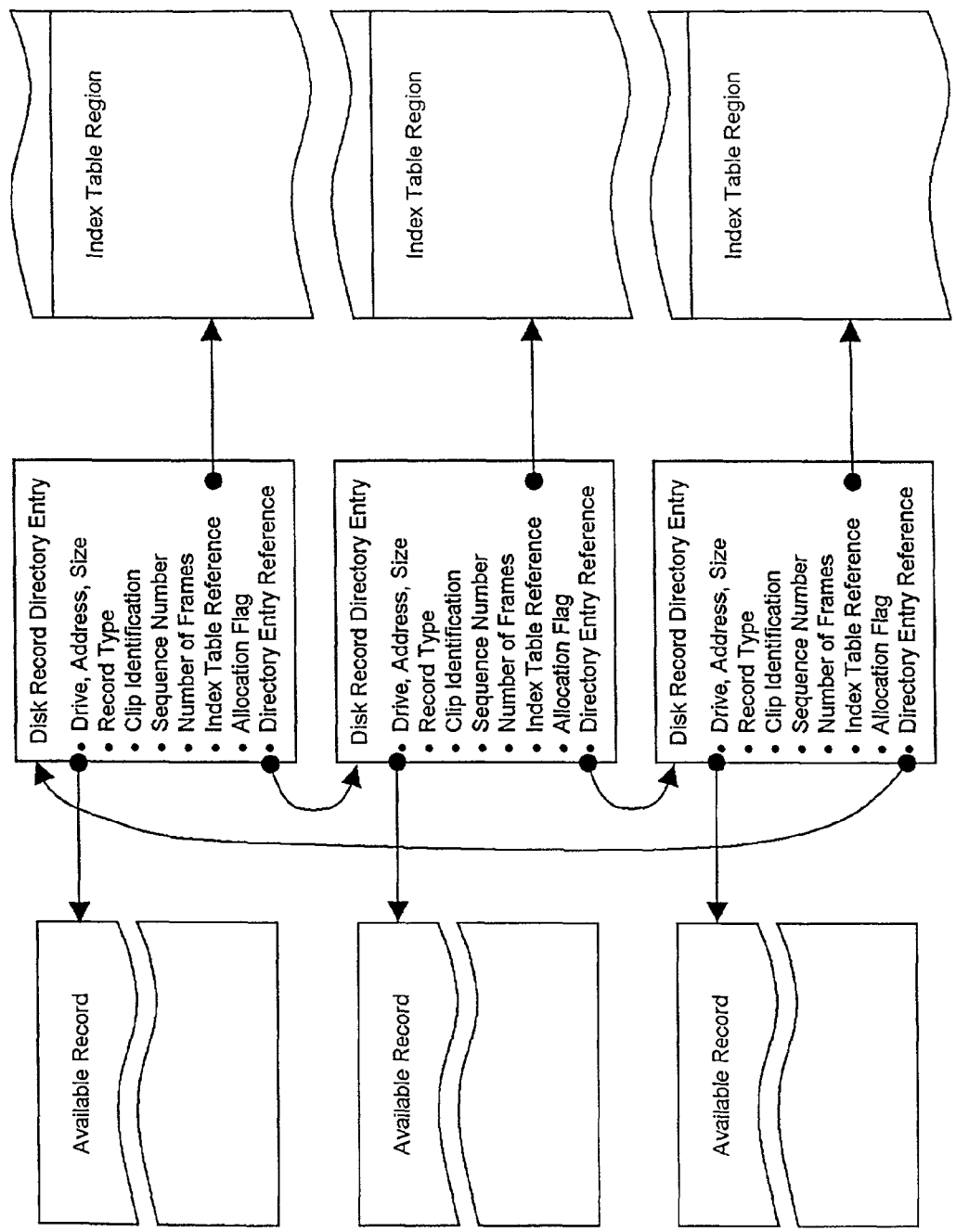
FIG. 4 is a block diagram representation of the relation between available records, disk record directory entries and index table regions.

The disk record directory thus provides the information the recording process needs to seamlessly record sequential video frames in proper order to disk across multiple Available Records. It also provides the information the recording process needs to "loop" video frame recording when it reaches the end of available disk space and overwrite previously recorded video frames in a continuous manner. FIG. 4 shows an example of the relationships between disk record directory entries, Available Records and index table regions for a loop across three Available Records.

Figure 5:
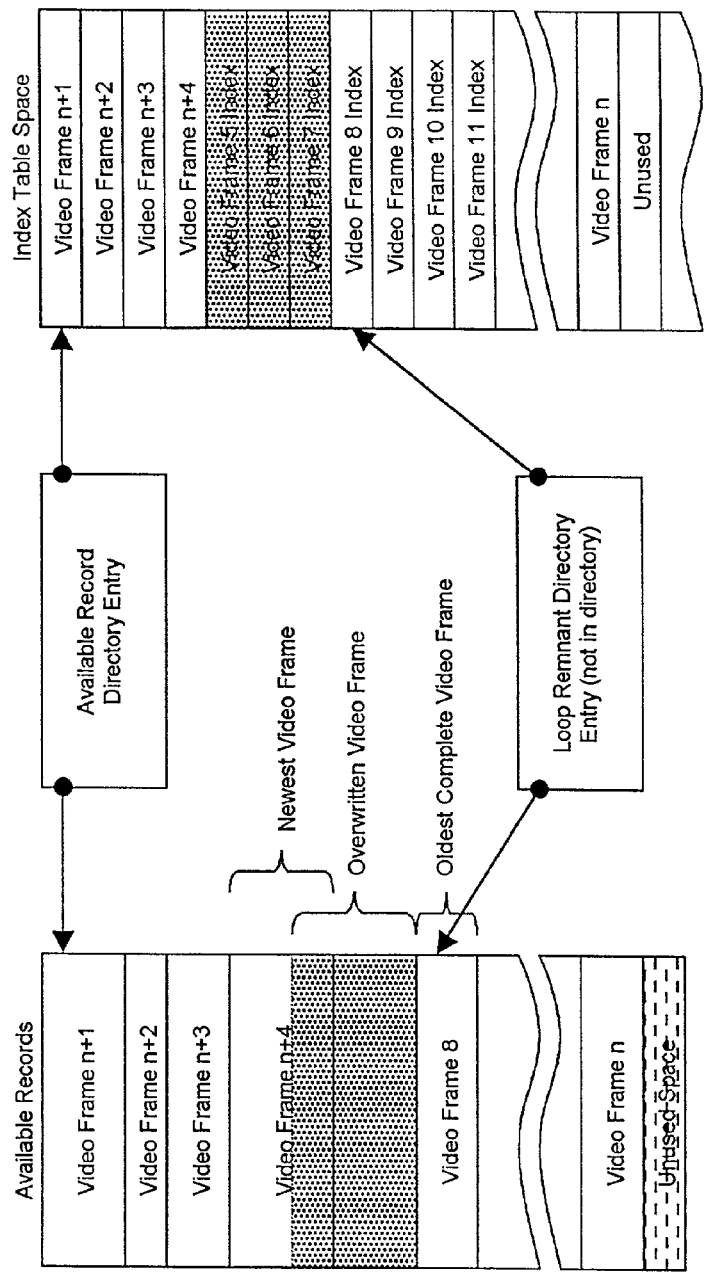
FIG. 5 is a block diagram representation of the relation between available records and index table space for use in logs records.

The uniqueness of the invention's firmware comes with the addition of the requirement to loop within the allocated index table space as well as within the allocated disk space. Fundamentally, a loop condition is created when either the available disk space or the available index table space is exhausted. Looping then overwrites frames by either overwriting the actual video frames on disk, or by overwriting the frame disk block addresses in the index table, or both. In addition, the overwrite process must maintain synchronization between the loss of video frames on disk and the loss of their disk block addresses ("indices") in the index table. Otherwise, a condition would exist where some portion of the index table contains disk block addresses that do not align to the start of compressed video frames on disk. This then would cause random access playback features to fail since the compressed video frame format is no longer aligned to be properly decompressed. FIG. 5 shows an example where a loop has just occurred. Here, a larger set of four video frames has overwritten a smaller set of seven video frames. Although the indices for frames 5 through 7 have not been overwritten in the index table, since these frames have been overwritten on disk, their indices must be deallocated from the index table as well.

The invention's recording process deallocation firmware manages the deallocation of both video frames on disk and their indices in the index table as they are overwritten during recording. The deallocation process also currently employs a simplification to the general case by looping both the video frames on disk and their indices in the index table at the same time when either the space on disk or space in the index table is exhausted. This causes the loop boundary to always exist at the start of the space on disk and start of space in the index table concurrently. This avoids the necessity in the general case of joining index table fragments at the loop boundary.

Since the recording process places information regarding the video frames currently being recorded into the Available Record's directory entry, the deallocation firmware maintains a copy of the Available Record directory entry for the deallocation point. This copy is called the "loop remnant" directory entry because it refers to the remnant of the oldest video that still remains in the Available Record being overwritten (see FIG. 5). The deallocation firmware updates the disk block address, index table reference and number of frames in the loop remnant directory entry as video frames and indices are deallocated. (Note that the disk block address of the Available Record in its entry in the directory is never changed, since this would corrupt the directory.) When recording is finally terminated, the loop remnant directory entry represents the start of the video loop (i.e., refers to the oldest sequence of video frames). If the overwrite point is not on an Available Record boundary, the Available Record containing the overwrite point is split into two disk records, the first being the newest portion of video frames (represented by the Available Record directory entry with a smaller size), and the second being the oldest portion of video frames (represented by the loop remnant directory entry copied into the disk record directory). The associated portions of the index table are likewise split to become two Control Records. The portions of the Available Records used by the recording are converted into Media Records.

With the time delay mode enabled, the recording board sends video frame information to the playback board via a serial communications link. This information consists of two parts, the disk address of the individual video frame and information that identifies the Available Record directory entry associated with the video frame location. This information allows the playback board to create its own index table for the newly recorded material and generate the data structures required for video playback. Like the recording board, the playback board also has to deallocate video frames from the playback data structures and indices from the index table as loop recording overwrites video frames. Since the playback board can access any of the newly recorded video frames on disk, the playback deallocation firmware actually deallocates a number of frames ahead of the actual overwrite point. This prevents the playback board from accessing information that is in the process of being overwritten. Also, since there is some delay associated with the transmission of video frame information across the serial communications link, the playback board is able to access video frames up to some number of frames behind the current recording position. The playback firmware accounts for the condition where playback encounters these resulting endpoints by keeping the playback position within existing video through properly advancing the playback frame position depending on the playback mode (e.g., stopped or playback at a particular frame rate). This allows the playback board to continue playback indefinitely without interruption.

Memory Controller

Figure 6:
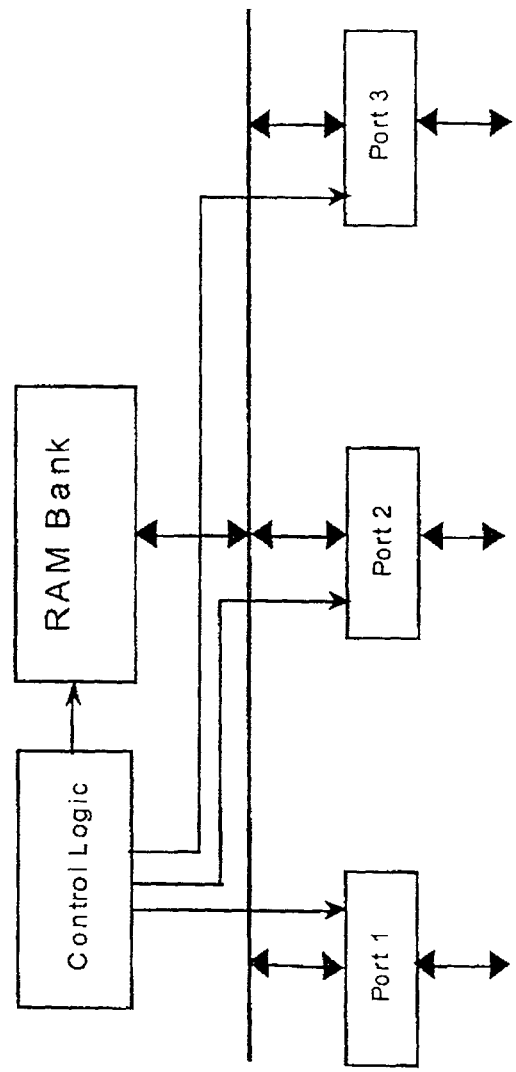
FIG. 6 is a general block diagram of an arbitration assembly for multi-port access to a single memory device.

It is common in digital systems to have a requirement wherein several processes need access to a common memory. A typical means of solving such a requirement is illustrated in FIG. 6. A single ported commercial memory device, or bank of such devices is provided with several access paths, or externally implemented ports, by which data from several sources can flow in and out. Control logic must arbitrate between the processes requiring access to the memory, and select a single port for connection to the memory bank for each access cycle.

Quite often, the mechanism by which access to the memory is allocated is either performed on a demand basis, or according to a fixed time-plan. With the demand method, the process requiring usage of the memory generates a "request" signal, to which the control logic responds with a "grant" when the port is to be given access. With the time-plan method, access is granted at fixed time intervals on a repetitive periodic basis. These mechanisms are very suitable for certain types of processes which either generate memory requests in an unpredictable fashion, such as random CPU accesses, or in a very regular, completely predictable pattern, as with screen refresh in graphics subsystems.

Figure 7:
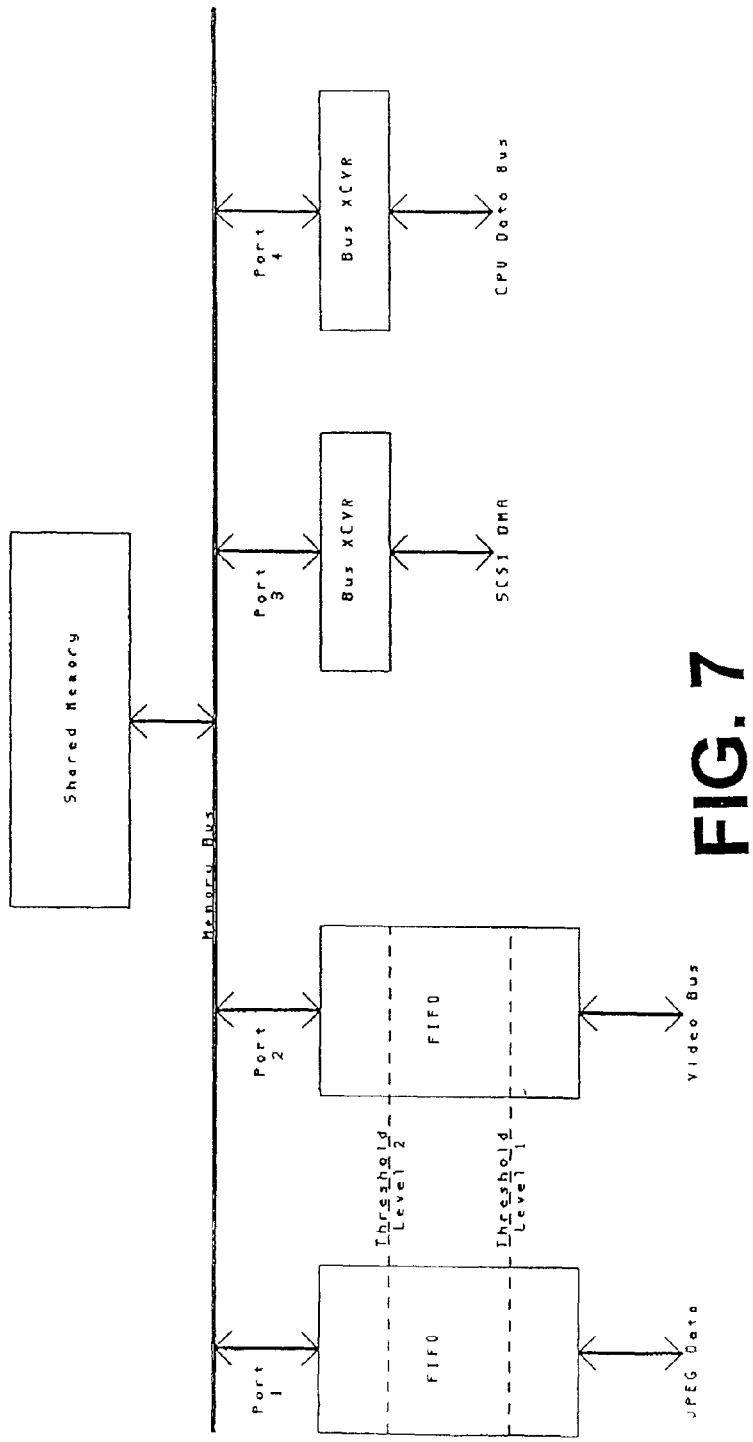
FIG. 7 is a block diagram similar to that of FIG. 6, but for a 4-port memory system.

The present invention implements a new method for allocating shared memory bandwidth, which is particularly efficient at managing the relatively unpredictable high-bandwidth data flows found in variable-rate digital video streams. This mechanism can be considered as a variation of the demand-driven method, and operates by making measurements of each data flow in progress. A dynamic estimate is thereby developed, which is used to predict the urgency of each port's requirements. This estimate is fed to the arbiter as a multi-level request. The arbiter then uses the estimates to select one of the contending ports for access on the next memory cycle. This procedure allows the allocation pattern of memory cycles to dynamically adjust to unpredictable data-flow requirements FIG. 7 shows a 4-port memory system where multi-level arbitration is used on two of the ports, numbered 1 and 2. This is similar to the configuration of the video recorder board. Data flowing to or from the two ports in question is first directed through staging First-In-First-Out (FIFO) data buffers connected to the memory bus.

Let us first consider the case where the video data is flowing into the memory. As the data in the FIFO accumulates, a multi-level request is presented to the arbitration logic. This request is derived from the data level in the FIFO and therefore reflects an estimate as to how soon the FIFO might be expected to overflow, thus resulting in data loss and corruption of the video stream. If no data is in the FIFO, the request level is "0", for no request. If some data is in the FIFO, but the level is below a minimum (marked as threshold 1 in the figure), the request level is "1", or low priority. In this case, the arbiter might service the port only when no other is requesting service. If the data level in the FIFO is between threshold levels 1 and 2, a mid-priority level "2" request is presented; whereas a data level above threshold 2 results in a high-priority level "3" request. In this last case, the arbitration logic could service the port on the next memory cycle regardless of requests from other ports.

If the data flow is reversed such that data is flowing out of the memory into the FIFO, and then to the video hardware, then the request priorities associated with the FIFO data levels are reversed as well. Level "0" would then correspond to a full FIFO whereas a nearly empty FIFO, with data level below threshold 1, would generate a level "3" request.

Figure 8:
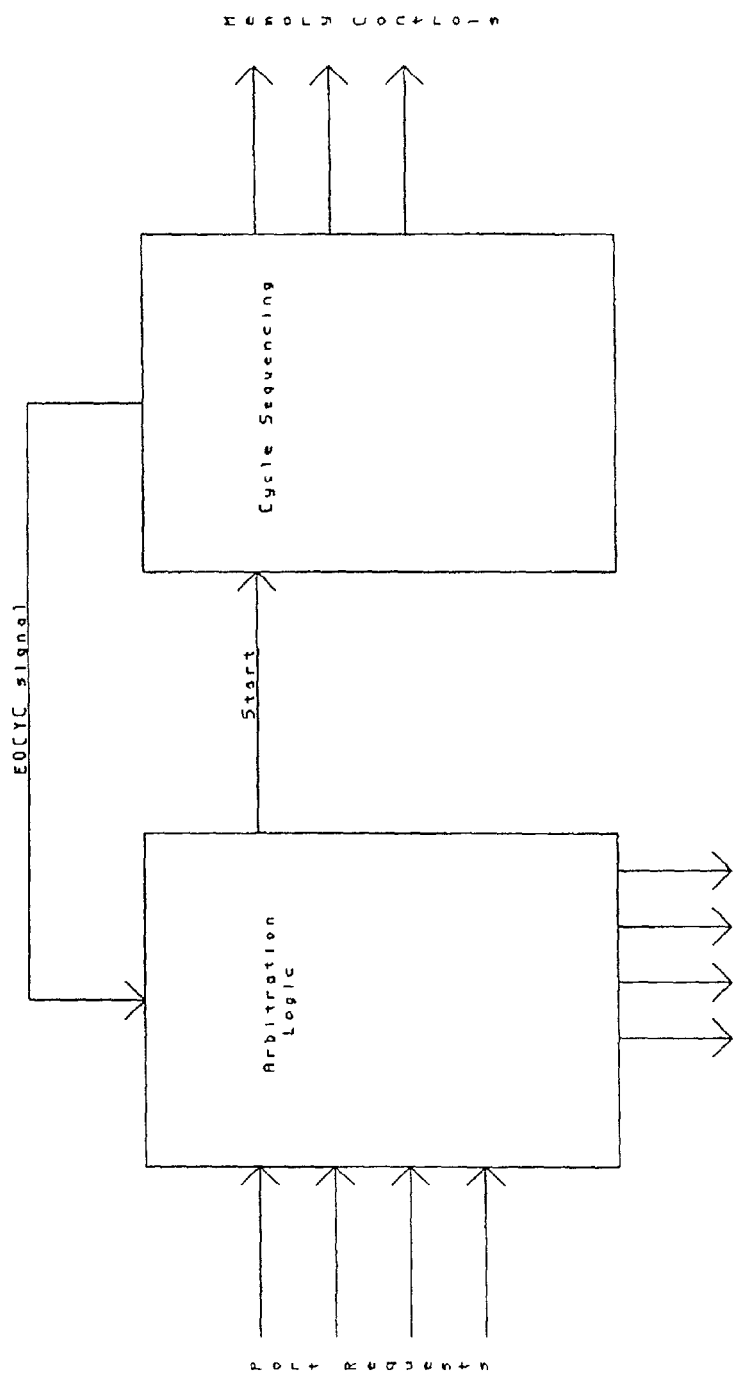
FIG. 8 is a block diagram of memory control logic employed in the system of FIG. 7.

FIG. 8 is a block diagram of memory control logic associated with the system of FIG. 7. The arbitration block receives the requests from the ports. In the case of ports 1 and 2, these requests will be multi-level. It then generates the port selection signals to connect whichever port it selects for the next memory cycle to the memory bus, and also a start signal to the cycle sequencing block. The sequencing block generates the signals needed to control the memory chips, and sends the EOCYC (end of cycle) signal back to the arbiter to enable port select.

Figure 9:
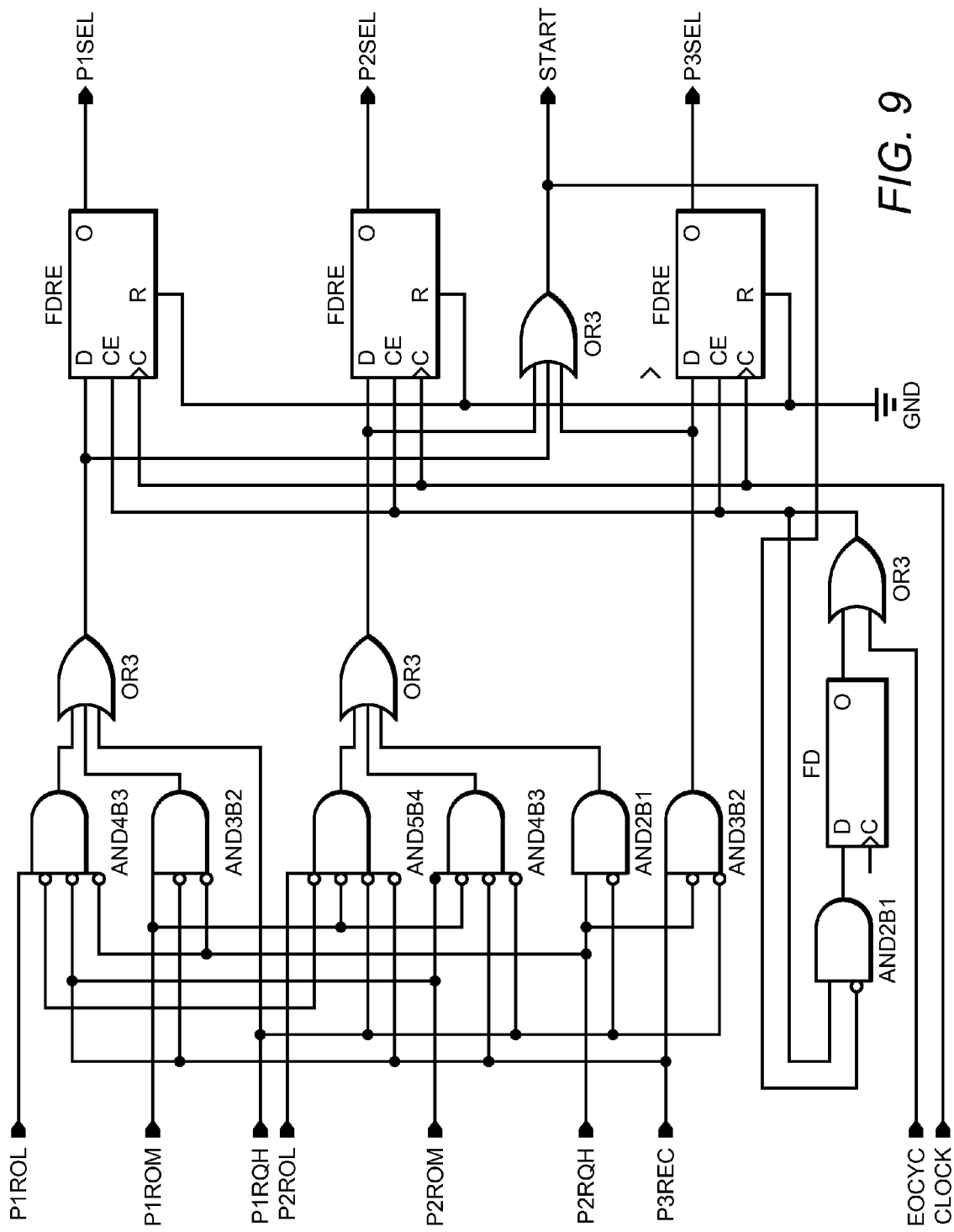
FIG. 9 is a logic schematic of a simplified arbiter.

In FIG. 9, the implementation of a simplified arbiter is shown. This logic will select one of 3 requesting ports of which ports 1 and 2 have multi-level requests. The multi-level requests are signaled by 3 lines for each port, P1RQL, P1RQM, and P1RQH, or P2RQL, P2RQM, and P2RQH respectively for port 1 and port 2. The port request logic drives only one of the 3 lines active at a time: RQL for a level 1 request, RQM for level 2, and RQH for level 3. Port 3 has only a single request line, P3REQ. The arbitration logic will select the highest priority requesting port according to the following fixed precedence, highest to lowest: P1RQH>P2RQH>P3REQ>P1RQM>P2RQM>P1RQL>P2RQL. It should be noted that the actual arbitration and sequencing logic provides additional features to help optimize system performance. These include arbitration for 5 ports, cycle sequencing for burst transfers, and arbitration fairness. This last feature prevents a single port from taking all successive memory cycles, and places an upper limit on latency to grant memory service to a requesting port.

The following illustrates how multi-level port request logic, selection logic, and the cycle sequencing, work together to implement dynamic arbitration in the invention:

| Requesting Port | Arbitration Logic | Sequencing Logic |
|---|---|---|
| 1. Port logic examines data flow and develops an estimate of the urgency for port service. It presents a multi-level request to arbitration representing this level of urgency. | 2. Arbitration examines requests from all ports, and selects the one which appears to have the highest urgency level. Port selection signals are activated, and start of cycle is signaled to Cycle Sequencing. | 3. Sequencing generates control signals to cycle memory and transfer data. |
| 4. The selected port transfers data to/from memory under control of the cycle sequencing logic. | | 5. The data transfer is completed and the cycle is terminated. |
| | 6. Arbitration selects a port for the next cycle. | |

Dynamic Metering of Compressed Video Data Rate to Maximum Disk Bandwidth

The user configures the invention to record video at a specified compression ratio. Two factors influence the level of compression the user may desire: 1) image quality is to a point inversely related to the level of compression, lower compression resulting in a higher quality image; and 2) maximum recording duration is directly proportional to the level of compression. In many applications maximum image quality is the primary concern. In these cases, the user typically configures the recorder for the minimum possible compression.

Any specified compression level translates directly into a target data rate since incoming video is digitized to a fixed resolution, say 720 by 486 pixels at 2 bytes per pixel. The North American standard for motion video runs at 29.97 frames per second, so this yields an uncompressed data rate of 720×486×2×29.97=20,974,204.8 bytes per second. A specified compression ratio of 4:1, for example, translates to a target data rate of (20,974,204.8/4), or about 5 megabytes per second.

In JPEG (Joint Photographics Experts Group) compression, the method used in the inventive recorder, one particular parameter controls the level of compression. This parameter is the amount of quantization the compression encoder applies to the pixel values during the succession of transformations and encoding schemes specified in the JPEG compression method.

Maintaining a constant output data rate while compressing a series of changing images is problematic because it is impossible to predict the results from a given level of quantization: The performance depends on the image. The same quantization parameters produce compressed images that vary in size by an order of magnitude between, for example, a black frame and a complex, highly detailed image.

Fortunately, the compression encoder used in the invention's circuit board embodies a bit-rate control mechanism that varies the quantization parameters automatically on an image by image basis, statistically monitoring the results to converge on a specified target data rate. Since motion video usually contains long series of similar images, this method is effective over an extended period of time. A rapid change in the image due to a quick event in the program or editing, however, generates an instantaneous peak in the size of compressed frames and consequently in the short-term data rate.

The installed disk drive(s) may be unable to write the compressed data stream without interruption in the event the user has configured a data rate beyond the disk's capability or in the event of an extended peak in the compressed data rate for the reasons outlined above. In demanding applications, this results in a catastrophic failure: The only way the recorder can recover is to skip frames, losing them irretrievably.

To overcome this problem, the invention's firmware includes an algorithm that statistically monitors the performance of the disk compared to the video frame rate to determine the disk's actual maximum data rate in the context of current conditions. The algorithm also checks the state of the first-in, first-out (FIFO) memory buffer between the compression encoder and the disk to insure the buffer is not in danger of overflowing. If the disk is unable to sustain the user-configured data rate, the firmware reprograms the compression encoder's target data rate to the maximum data rate the disk can support. The firmware repeats this process continuously, dynamically adjusting for changing video data rate and disk performance. As conditions change, the data rate converges on the user-specified compression level or the maximum data rate the disk can sustain over time, whichever is less. Most important, this algorithm prevents the recoder from the unacceptable deficiency of dropping frames during recording.

Figure 10:
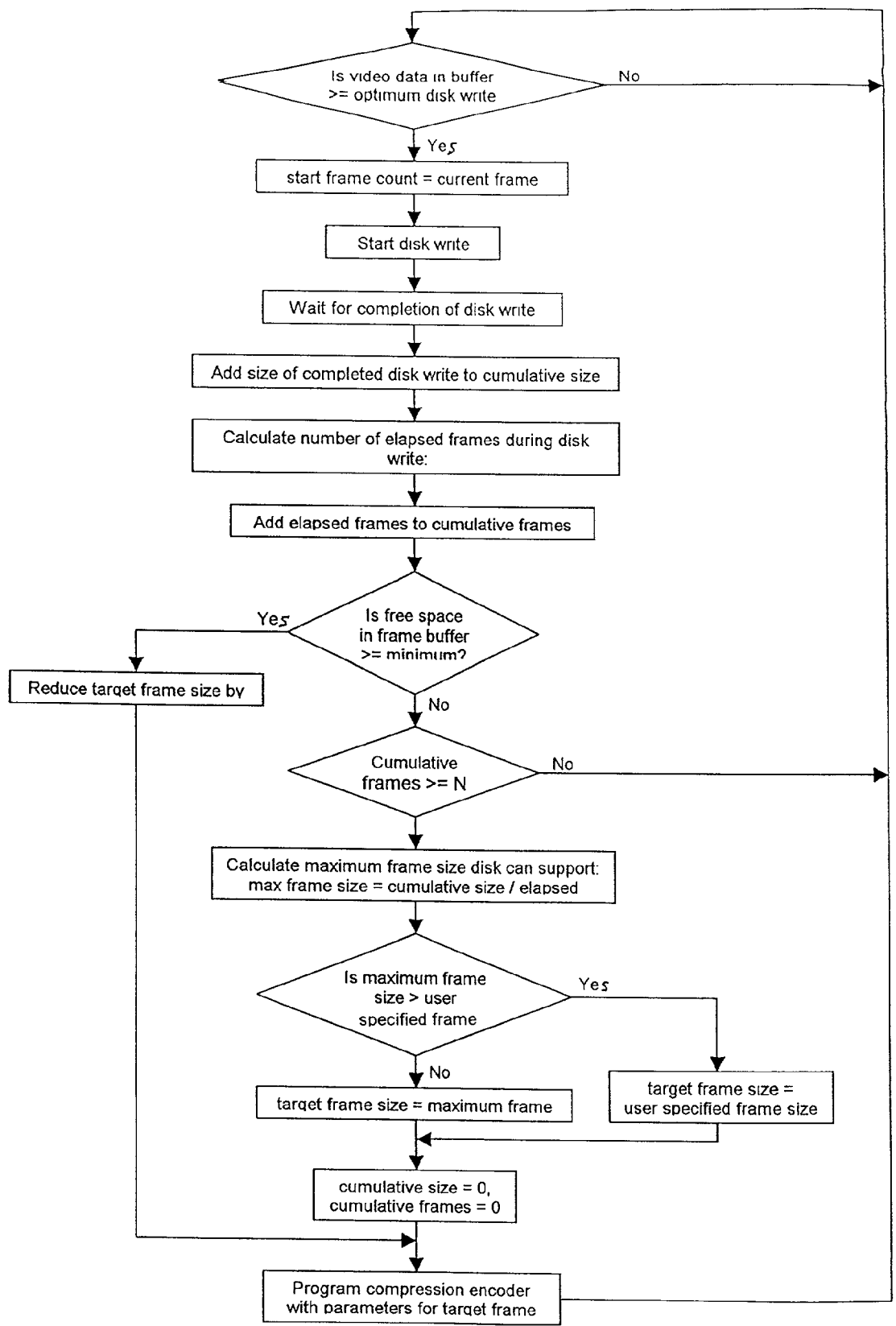
FIG. 10 is a flow chart describing a dynamic metering algorithm for controlling the recorder's compression and coding rate.

The flow chart of FIG. 10 details this dynamic metering algorithm as implemented in the inventive recorder.

Having thus disclosed a preferred embodiment of the invention, it being understood that numerous modifications and additions are contemplated and that the scope of protection afforded hereby is to be limited only by the appended claims and their equivalents, Having thus disclosed a preferred embodiment of the invention, it being understood that numerous modifications and additions are contemplated and that the scope of protection afforded hereby is to be limited only by the appended claims and their equivalents, what is claimed is:

1. A method of recording a video sequence having a first video frame and a second video frame, comprising:
providing a random access memory having a plurality of memory locations corresponding to a plurality of memory addresses;
using a linked list to allocate different first and second regions, each region comprising contiguous ones of the memory locations, where the first region and the second region are separated by at least one intervening region of memory locations;

compressing the first and the second video frames into a first variable sized compressed frame and a second variable size compressed frame having a different size than the first compressed frame;

writing the first compressed frame to a first memory location having a first memory address within the first region, and writing the second compressed frame to a second memory location having a second memory address within the second region;

storing a first frame address and second frame address in a frame index corresponding to the first and second memory addresses in the first and second regions, respectively, where the compressed frames are written; and allowing the second video frame to be cued within a single frame latency time while playing back the first video frame from the first region by obtaining the second frame address from the frame index, retrieving the second compressed frame from the second region, decompressing the second compressed frame, and playing back the second video frame.

2. The method of recording of claim 1, wherein the frame index identifies the first and second compressed frames using at least one of frame number, time, and date.

3. The method of recording of claim 1, wherein the first frame address to which the first compressed frame is written is a start address for a video clip.

4. The method of recording of claim 1, wherein the step of using the linked list to allocate the regions of memory locations comprises identifying a largest one of the regions.

5. The method of recording of claim 1, wherein the frame index comprises an frame index table stored in a random access memory.

6. The method of recording of claim 5, further comprising protecting the first compressed frame from being overwritten by a third variable sized compressed frame via writing the third compressed frame at a memory location corresponding to at least one of the memory addresses of the first selected regions other than the first frame address.

7. The method of recording of claim 1, further comprising looping the memory by creating additional compressed frames from subsequent video frames of the video sequence, and overwriting the first compressed frame with one of the additional compressed frames having a size different from that of the first compressed frame at the first memory location.

8. A method of storing and playing back a video recording having 1 though n variable length video frames, where n is at least 9 comprising: storing each of the n video frames in n different memory locations, respectively; using a random access frame index to store pointers to each of the n memory locations; using the frame index to obtain a frame address referencing one of the n different memory location; and using the frame address to directly locate, access, decompress, and playback any individual ones of the n video frames out of sequence within a single frame latency time while playing back any one of the other video frames.

* * * * *